United States Patent Office 3,347,871
Patented Oct. 17, 1967

3,347,871
NOVEL BISPHENOLS OF SPIROBI(META-DIOXAN) AND THEIR PREPARATION
James Harding, Dunellen, N.J., assignor to Union Carbide Corporation, a corporation of New York
No Drawing. Filed Apr. 16, 1964, Ser. No. 360,410
4 Claims. (Cl. 260—340.7)

This invention relates to novel bisphenols and condensation polymers prepared from them.

Heretofore it has been known to condense phenols with aldehydes and ketones to produce bisphenols. The bisphenols thus produced have their phenolic portions on a single carbon atom. The close proximity of the phenolic portions has limited the control which can be exercised over the properties of these known bisphenols and condensation polymers containing these bisphenol moieties. Methods have been proposed to put the phenolic portions on different carbon atoms as by a double Fries rearrangement of the phenolic esters of dibasic acids, but such processes have not been practically useful.

It is an object, therefore, of the present invention to provide bisphenols wherein the phenolic portions are attached to different carbon atoms.

It is another object to provide condensation polymers containing bisphenol moieties whose phenolic portions are attached to different carbon atoms.

It is another object to provide bisphenol condensation polymers having high glass transition temperatures and inherent toughness.

It is another object to provide bisphenol epoxy resins having high heat distortion temperatures and tensile properties.

It is another object to provide a practical method for producing bisphenols whose phenolic portions are on different carbon atoms.

It is another object to provide novel bisphenols and bisphenol glycidyl ethers.

It has now been discovered that bisphenols having phenolic portions on different carbon atoms are prepared by contacting together pentaerythritol and at least a stoichiometric amount of a carbonyl substituted phenol with an acidic catalyst.

The reaction shown for p-hydroxybenzaldehyde and pentaerythritol proceeds, in general, as follows:

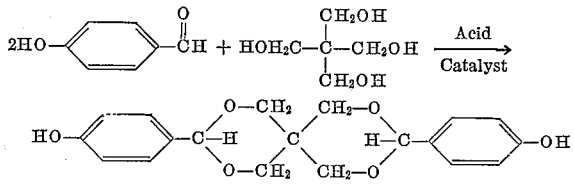

This compound is a bisphenol of spirobi(meta-dioxan), 3,9-bis(p-hydroxyphenyl)spirobi(meta-dioxan), and is a new compound.

Although a molar excess of carbonyl substituted phenol over pentaerythritol can be employed if desired, a substantially stoichiometric ratio is preferred, since the isolation of the bisphenol of spirobi(meta-dioxan) is simplified when there is no residual excess of either reactant remaining therewith. Where polysubstitution of the carbonyl substituted phenol renders it less reactive or sluggish, it may be desirable to use this component in excess in order to enhance the reaction rate of that particular system but in general, with unsubstituted or less substituted phenolic reactants, a ratio of about two moles of carbonyl substituted phenol to about one mole of pentaerythritol is especially preferred.

The reaction can be carried out at atmospheric, sub-atmospheric, or superatmospheric pressure and at temperatures ranging from about 30° C. to about 100° C. Reaction temperatures of about 50° C. to 100° C. permit reaction without the use of elaborate pressure equipment and thus are preferred. Particularly preferred is reaction under atmospheric pressure at temperatures from 70° C. to 95° C.

Pentaerythritol is a commercially available tetrahydric alcohol melting at 260° C. which can be prepared by the reaction of acetaldehyde with formaldehyde. It is moderately soluble in cold water, readily soluble in hot water and has a limited solubility in organic liquids.

Phenols which can be reacted with pentaerythritol to form the bisphenols of this invention are hydroxy substituted aryl compounds having a carbonyl group attached to a ring carbon atom in a position other than ortho, i.e., either meta or para to a phenolic hydroxyl. A "carbonyl group" as the term is used in the present specification and claims is a monovalent aldehyde or a ketone radical having the structure

wherein R is hydrogen or a lower hydrocarbon monovalent radical having up to 10 carbon atoms. Illustrations of such radicals include those derived from alkanes, such as, methane, ethane, propane, butane, isobutane, pentane, isopentane, hexane, heptane, octane, isooctane, 2-ethylhexane, nonane, decane and the like; alicyclics such as cyclobutane, cyclopentane, cyclohexane and the like; and aromatics such as benzene, toluene, xylenes, and the like. Among the phenols deserving of special mention are: hydroxy substituted benzenes, e.g., phenol, catechol, pyrogallol, resorcinol and trihydroxy substituted benzenes; and substituted phenols having in the meta positions, or para position, one or more substituents such as alkyl groups, aryl groups, alkaryl groups, aralkyl groups, halogen groups, i.e., fluorine, chlorine, bromine and iodine, alkoxy groups and aryloxy groups. Preferred as substituents in the above compounds are straight and branched chain alkyl and aralkyl groups having from 1 to 10 carbon atoms, particularly lower alkyl substituents, i.e., having from 1 to 6 carbon atoms. Among the substituted phenols those deserving of special mention are the cresols, xylenols, guaiacol, methylphenol, ethylphenol, butylphenol, octylphenol, dodecylphenol, eicosylphenol, tricontylphenol, and tetracontylphenol.

Thus, the term "bisphenol of spirobi(meta-dioxan)" used herein includes compounds having the formula

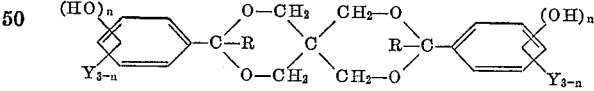

wherein R is hydrogen or a lower hydrocarbon monovalent radical as defined above, Y is a hydrogen, or one or more hydrocarbon substituents free of aliphatic unsaturation, halogen or saturated oxyhydrocarbon substituents on a phenolic ring carbon atom, e.g., selected from alkyl, aryl, alkaryl, aralkyl, alkoxy, hydroxyl or fluorine, chlorine, bromine or iodine groups and $n$ is an integer from 1 to 3. The point of attachment of the above phenolic portions can be meta or para to a phenolic hydroxyl.

The catalyst used in the reaction of the above carbonyl substituted phenols with pentaerythritol in the present invention comprises strong acids as well as the hydrogen form (H+) of a cation exchanging resin, i.e., an "acidic" cation exchanging resin.

Representative strong acids which can be used as catalysts in this invention include mineral acids such as sulfuric, hydrochloric, hydrofluoric, hydrobromic, phosphoric, trichloroacetic acids and the like; acid activated clays such as bentonite; natural and synthetic aluminosilicates such as Linde decationized molecular sieves or zeolites; and arylsulfonic acids such as p-toluenesulfonic, benzenesulfonic, benzene-m-disulfonic, benzene-p-disulfonic acids and the like. The concentration of acid catalyst is not narrowly critical with as little as 0.05 part and as much as 10 parts per hundred of pentaerythritol being equally effective. A preferred range lies between about 0.1 and 3.0 parts of acid per hundred parts of pentaerythritol.

The cation exchanging resins are insoluble in the reaction mixture and hence, there is no problem of catalyst separation from the reaction mixture or need of removal of small amounts of catalyst residues in the product. The service life of the acidic cation exchanging resin in this method is nearly infinite and hence, the resin does not of necessity have to be regenerated, if care is exercised in preventing the introduction of basic metal ions such as sodium, potassium, calcium, etc. or other contaminants which inactivate the cation exchanging groups of the resin. The use of this insoluble catalyst confers the additional advantages of (1) eliminating the need for acid corrosion resistant equipment which is otherwise essential, and (2) making unnecessary any neutralization steps.

The cation exchanging resins are substantially insoluble polymeric skeletons with strongly acidic cation exchanging groups chemically bound thereto. The exchange potential of the bound acidic groups and the number of them which are available for contact with the reaction mixture determine the catalytic effectiveness of a particular cation exchanging resin. Thus, although the number of acidic groups bound to the polymeric skeleton of the resin determines the theoretical "exchange capacity" thereof, a more accurate criterion of catalytic effectiveness is the number of acidic groups available for contact with the reactants. This contact can occur on the surface or in the interior of the cation exchanging resin; therefore, a physical form of resin which provides a maximum amount of surface area for contact and diffusion, e.g., porous microspheres or beads, is highly desirable and affords the highest rate of reaction and reaction economy in this process. The particular form of the cation exchanging resin used, however, is not critical.

The cation exchanging resins should be substantially insoluble in the reaction mixture and in any solvent to which the resin may be exposed in service. Resin insolubility is generally attributable to crosslinking within the resin but can be caused by other factors, e.g., high molecular weight or a high degree of crystallinity.

In general, the greater the exchange capacity of a resin, i.e., the greater the number of milliequivalents of acid per gram of dry resin, the more desirable is the resin. Resins having an exchange capacity greater than about two milliequivalents of acid per gram of dry resin are preferred. Particularly preferred are resins with bound cation exchanging groups of the stronger exchange potential acids. Results obtained with cation exchanging resins having bound sulfonic acid groups have been highly satisfactory. Among the cation exchanging resins which are highly deserving of special mention are: sulfonated styrene-divinylbenzene copolymers, sulfonated crosslinked styrene polymers, phenol-formaldehyde sulfonic acid resins, benzene-formaldehyde-sulfonic acid resins, and the like. Most of these resins and many others are available commercially under trade names such as: Amberlite XE-100 (Rohm and Haas Co.); Dowex 50 X-4 (Dow Chemical Co.); Permutit QH (Permutit Co.); and Chempro C-20 (Chemical Process Co.).

Many cation exchanging resins are received from the manufacturer in the form of the sodium or other salt and must be converted to the hydrogen or acid form prior to use in this process. The conversion can be easily accomplished by washing the resin with a solution of a suitable mineral acid, e.g., sulfuric, hydrofluoric or hydrochloric acids. For example, a sulfonated resin can be suitably washed with a sulfuric acid solution. Salts formed during the conversion procedure are conveniently removed by washing the resin with water or solvent for the salt.

It frequently happens as a result of either the washing operation outlined above, or the manufacturer's method of shipping, that the resin will contain from 50 percent to 100 percent of its own weight of water. All but about 2% of this water as a maximum is preferably removed prior to use of the cation exchanging resin. Suitable methods for removing the water in the resin include drying the resin under reduced pressure in an oven; soaking the resin in a melted anhydrous phenol for a time sufficient to fill the resin interspaces with a phenol; and azeotropic distillation of the water.

The resin when once conditioned in this manner, to insure anhydrous conditions, i.e., 2% water throughout, does not require reconditioning at any time during use. Alternatively, the resin can be conditioned after installation in the process equipment merely by running the reaction mixture through the resin until sufficient water is removed. In this latter procedure dehydration is accomplished by the reaction solvent.

Solvents are not essential for this invention, but their use is preferred. Solvents which can be employed in preparing the bisphenols of this invention include aromatics, such as benzene, toluene, xylene and the like, alicyclics such as cyclohexane, methylcyclohexane and the like and polar solvents such as dimethyl sulfoxide, dimethyl formamide, nitroethane, and the like. While the choice of solvent is not critical, the synthesis of the bisphenols of pentaerythritol is more efficient when a solvent system is established in which both pentaerythritol and the starting phenol are soluble. In this regard a mixture of a polar solvent such as dimethyl sulfoxide and an aromatic solvent such as benzene is particularly preferred. This mixture provides an azeotroping solvent which can serve to remove water formed during the reaction as well as water present in the cation exchanging resins if such are used as the catalyst.

The product bisphenols in solution are readily separable from the resin catalyst by filtration and can be purified by a vacuum stripping operation which removes undesirable impurities.

Polypentaerythritols such as dipentaerythritol, tripentaerythritol and tetrapentaerythritol as well as cyclic polyhydroxyalcohols as for example anhydroenneahepitol,

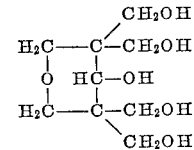

2,3,5,6-tetramethylol-1,4-hydroquinone dimethyl ether and the like can be substituted for pentaerythritol in this invention if so desired.

It has been found that a variety of useful polymers can be synthesized from the bisphenols of this invention. For example, by reacting these bisphenols with epihalohydrins, epoxy resins are produced which when hardened with curing agents, well known in the art, afford thermoset resins having high heat distortion temperature, as well as high tensile, impact, and flexural strengths. In a typical synthesis 3,9 - bis(p-hydroxyphenyl)spirobi(meta-dioxan) and an epihalohydrin afford the epoxy resin or glycidyl ether shown below:

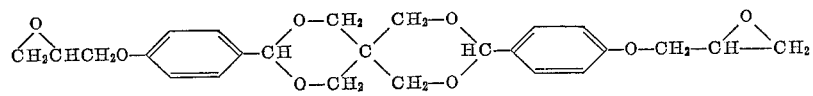

trap and thermometer was charged with 800 g. of dimethyl sulfoxide, 1000 g. of benzene and 144 g. of Dowex 50 X-4 cation exchanging resin (a sulfonated styrene-divinyl benzene copolymer) followed by refluxing for 9.5 hours at a temperature of about 92–94° C. The water which had collected in the Dean-Stark trap was discarded. Then 150 g. (7.1 moles) of mono-pentaerythritol and 275 g. (2.25 moles) of p-hydroxybenzaldehyde was added to the reaction flask. The reactants were left at reflux temperature, for an additional 15 hours during which period about 44 g. of aqueous distillate was collected in the Dean-Stark trap. Theoretically 2.2 moles of p-hydroxybenzaldehyde should produce 39.6 g. of water in this reaction. The Dowex cation exchanging resin was separated from the reactants by filtration for re-use in further reactions. The hot filtrate was diluted with 2000 ml. of benzene and cooled whereupon 347 g. (92% yield of 3,9-bis-(p-hydroxyphenyl)spirobi(meta-dioxan) crystallized out of solution. This product was isolated by filtration, washed with an additional 2000 ml. of benzene and dried. It then was found to have a melting range of 249–257° C. and an hydroxyl content of 10.0% (theoretical—9.9%).

*Example 2.—Preparation of 3,9-bis(p-chlorohydroxyphenyl)spirobi(meta-dioxan)*

The procedure described in Example 1 is followed with 352 g. (2.25 moles) of 3-chloro-4-hydroxybenzaldehyde being substituted for the p-hydroxybenzaldehyde and affords 3,9-bis(p - 2 - chlorohydroxyphenyl)spirobi(meta-dioxan).

*Example 3.—Preparation of 3,9-bis(p-2-methylhydroxyphenyl)spirobi(meta-dioxan)*

The procedure described in Example 1 is followed with 333 g. (2.25 moles) of 3-methyl-4-hydroxybenzaldehyde being substituted for the p-hydroxybenzaldehyde and affords 3,9-bis(p - 2 - methylhydroxyphenyl)spirobi(meta-dioxan).

*Example 4.—Epoxidation of 3,9-bis(p-hydroxyphenyl)spirobi(meta-dioxan)*

A 3-neck, 3-liter round-bottom flask equipped with a reflux condenser, thermometer, mechanical agitator, and dropping funnel was charged with 1110 g. (12.0 moles) of epichlorohydrin, 344 g. of ethanol and 688 g. (2.0 moles) of 3,9-bis(p-hydroxyphenyl)spirobi(meta-dioxan). Dissolution of the reactants was achieved be heating the reactants to 60° C. Then 184 g. of 50% aqueous sodium hydroxide was added with stirring at 60–65° C. according to the schedule below:

18.4 g. over a 1 hour period
18.4 g. during the next 30 minutes
128.8 g. during the following hour
18.4 g. during the last hour Stirring was continued for an additional 20 minutes and then excess unreacted epichlorohydrin and ethanol removed by distillation under vacuum. The viscosity of the residual slurry was reduced by the addition of 900 g. of methyl isobutyl ketone and a series of washings were initiated with 500 ml. portions of water in the separatory funnel. The washings were continued until the pH was less than 8. The organic layer was vacuum distilled until a residue consisting of a white filterable slurry remained. The diglycidyl ether of 3,9-bis(p-hydroxyphenyl)spirobi(meta-dioxan) was obtained by filtration of the slurry. After drying this product had a melting point of 158° C., an epoxy assay of 242 (theoretical 228) and weighed 608 g. (66% yield).

*Example 5.—Epoxidation of 3,9-bis(p-2-methylhydroxyphenyl)spirobi(meta-dioxan)*

The procedure described in Example 4 is followed with 718 g. (2 moles) of 3,9-bis(p-2-methylhydroxyphenyl) spirobi(meta-dioxan) being substituted for the 3,9-bis(p-hydroxyphenyl)spirobi(meta-dioxan) and affords the diglycidyl ether of 3,9-bis(p-2-methylhydroxyphenyl)spirobi(meta-dioxan).

*Example 6.—Epoxidation of 3,9-bis(p-2-chlorohydroxyphenyl)spirobi(meta-dioxan)*

The procedure described in Example 4 is followed with 759 g. (2 moles) of 3,9-bis(p-2-chlorohydroxyphenyl) spirobi(meta-dioxan) being substituted for the 3,9-bis(p-hydroxyphenyl)spirobi(meta-dioxan) and affords the diglycidyl ether of 3,9-bis(p-2-chlorohydroxyphenyl)spirobi (meta-dioxan).

*Example 7.—Curing of diglycidyl ether of 3,9-bis(p-hydroxy)spirobi(meta-dioxan)*

Three hundred grams of the diglycidyl ether of 3,9-bis(p-hydroxyphenyl)spirobi(meta-dioxan) was melted at 160–170° C. in an electric oven, mixed with 61 g. of melted methylene dianiline and poured quickly into a preheated mold. This mixture was cured for 2 hours at 100° C. followed by 6 hours at 160° C. In this manner cured or hardened bars of thermoset polymer were obtained 5" long, 1" wide and ¼" deep. The following physical test data were obtained with these specimens:

| | |
|---|---|
| Izod impact strength (ASTM D–256–56) ft./lbs./in. | 0.60 |
| Heat distortion temperature (ASTM D–648–56) ° C. | 181 |
| Tensile strength (ASTM D–638–58T) p.s.i. | 9,300 |
| Elongation (ASTM D–638–58T) percent | 3.6 |
| Modulus of elasticity (ASTM D–638–58T) p.s.i. | 352,000 |
| Flexural strength (ASTM D–790–58T) p.s.i. | 18,340 |
| Flexural modulus (ASTM D–790–58T) p.s.i. | 552,000 |

The epoxy resins of this invention can be used for potting compounds, adhesives, coating applications and as a heat resisting encapsulation medium.

*Example 8.—Preparation of the dichloroformate of 3,9-bis(p-hydroxyphenyl)spirobi(meta-dioxan)*

To a slurry of 34.5 g. (0.1 mole) of 3,9-bis(p-hydroxyphenyl)spirobi(meta-dioxan) and 250 ml. of dry toluene cooled to 5° C. and contained in a one liter, 3-neck round-bottom flask equipped with a mechanical stirrer, reflux condenser, thermometer and dropping funnel is added 19.8 g. (0.2 mole) of phosgene. A solution of 24.2 g. (0.2 mole) of N,N-dimethylaniline in 25 ml. of dry toluene is then added dropwise from the dropping funnel. The reaction mixture is stirred at ambient tempertures for about 2 hours. Insoluble dimethylaniline hydrochloride is removed from the reaction product by filtration and the filtrate stripped of solvent in a vacuum distillation. The residue is dissolved in 100 ml. of methylene chloride and the solution passed through a silica gel column (12" high and 1⅝" in diameter). The product is eluted with 600 ml. of methylene chloride and the combined eluants are stripped free of solvent. The residue is the dichloroformate of 3,9-bis(p-hydroxyphenyl)spirobi(meta-dioxan).

*Example 9.—Preparation of the dichloroformate of 3,9-bis(p-2-chlorohydroxyphenyl)spirobi(meta-dioxan)*

The procedure described in Example 8 is followed with 41.4 g. (0.1 mole) of 3,9-bis(p-2-chlorohydroxyphenyl)-spirobi(meta-dioxan) thus affording the dichloroformate of 3,9 - bis(p - 2-chlorohydroxyphenyl)spirobi(meta-dioxan).

*Example 10.—Preparation of the dichloroformate of 3,9-bis(p-2-methylhydroxyphenyl)spirobi(meta-dioxan)*

The procedure described in Example 8 is followed using 37.3 g. (0.1 mole) of 3,9-bis(p-2-methylhydroxyphenyl)-

Various epihalohydrins such as epichlorohydrin, epibromohydrin, epiiodohydrin, and substituted epihalohydrins as for example, chloroisobutylene oxide and the like can be used. Catalysts employed in this preparation include sodium hydroxide, potassium hydroxide, lithium hydroxide, tertiary amines and sodium aluminate.

temperature cures in 3 to 6 hours may be achieved with polyfunctional amines while carboxylic acid cures require temperatures of 100 to 150° C. for complete reaction in 3 to 6 hours.

The general formula of the diglycidyl ethers available from the bisphenols of this invention is shown below:

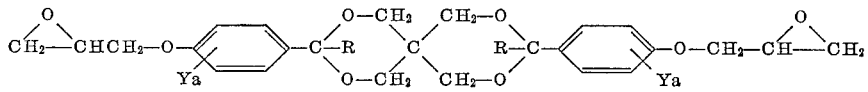

The reaction can be carried out in the melt or in the presence of a variety of inert liquid diluents, such as organic hydrocarbons, e.g., benzene, toluene and xylene; aliphatic hydrocarbons, e.g., hexane, heptane, and octane; ketones, e.g., acetone, methyl ether ketone and methyl isobutyl ketone; water; ethers, e.g., diethyl ether, dibutyl ether, dioxane and tetrahydrofuran; halogenated hydrocarbons, e.g., carbon tetrachloride, trichloroethylene and tetrachloroethane and aliphatic alcohols, e.g., methanol, ethanol, isopropanol and the like. It is preferred to use ethanol as the solvent in the practice of this invention.

The quantities of bisphenol and epihalohydrin should wherein R is hydrogen or a lower hydrocarbon radical, Y is hydrogen, halogen or a lower hydrocarbon radical and $a$ is an integer having values of 0 to 2.

Another class of useful polymers that can be prepared from the bisphenols of spirobi(meta-dioxan) is the polycarbonates by means of an interfacial condensation system. In a preferred synthesis the dichloroformate of the bisphenol of spirobi(meta-dioxan) is prepared first with phosgene and dimethyl aniline. When polymerized with an aqueous sodium hydroxide-methylene chloride mixture, a polycarbonate is obtained represented by the structure:

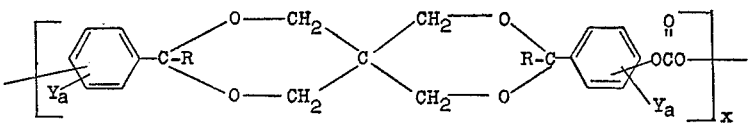

be such that at least two moles of epiholahydrin are present for each mole of bisphenol. The diluent concentration can be varied to give concentrations of from about 5% to 90% solids. The catalyst concentration generally ranges between 0.01% and 5% by weight based on the bisphenol. The reaction temperature usually ranges between 50° C. and 190° C. as determined by the diluent used, and the pressure. Pressures above atmospheric are not necessary but can be employed if desired, as can less than atmospheric pressures. The reaction time required for the formation of the diglycidyl ethers of this invention will vary with the reaction temperature used but ordinarily a range from 2 to 30 hours can be used.

wherein $x$ is an integer having a value sufficiently high as to afford a normally solid polymer, R is hydrogen or a lower hydrocarbon radical as previously defined and $a$ is an integer having values of 0 to 2.

The preparation of these polycarbonates is not limited to this method since direct phosgenation or ester interchange utilizing a diaryl carbonate, such as diphenyl carbonate, can also be employed.

Another series of useful condensation polymers available from the bisphenols of spirobi(meta-dioxan) is the polyurethanes. Thus, when the dichloroformate of a bisphenol of spirobi(meta-dioxan) is caused to react with piperazine a polyurethane is obtained having the structure

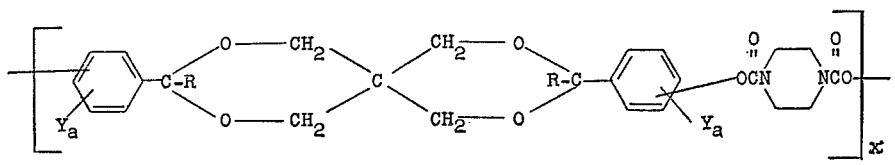

The conversion of the diglycidyl ethers of 3,9-bis(p-hydroxyphenyl)spirobi(meta-dioxan) to thermoset resins may be effected by methods well known in the epoxy resin curing art, thus facilitating their use with conventional equipment presently employed by fabricators using epoxy resins. These diglycidyl ethers may be cured or hardened by reaction with organic acids, organic acid anhydrides, and primary, secondary and tertiary amines, preferably in approximately stoichiometric amounts. Examples of suitable curing agents include oxalic acid, phthalic anhydride, hexahydrophthalic anhydride, pyromellitic anhydride, chlorendic anhydride, maleic anhydride, ethylene diamine, diethylene triamine, triethylene tetramine, dimethylamine, propylamine, boron trifluoride monoethylamine complexes, hydroxyethyl diethylene triamine, piperidine, α-methylbenzyl dimethylamine, tridimethylaminomethylphenol, metaphenylene diamine and the like. The curing conditions, viz., proportions of reactants, curing time and curing temperature depend on the curing agent used. In general, curing times of 5 minutes to 4 days and temperatures from 25° C. to 250° C. are employed. Room wherein $x$ is an integer having values sufficiently high as to afford a normally solid polymer, Y, R and $a$ are as defined above for the polycarbonates.

Polyesters of bisphenols of spirobi(meta-dioxan) can be synthesized by interacting dicarboxylic acids, esters or acid halides with bisphenols of spirobi(meta-dioxan), with or without the use of a solvent.

Poly(hydroxyethers) of bisphenols of spirobi(meta-dioxan) can be prepared by the procedure described in French Patent 1,309,491.

Other applications for the bisphenols of spirobi(meta-dioxan) include their use as hardeners for epoxy resins, bacteriocides, fungicides, miticides and antioxidants.

The following examples illustrate the practice of the present invention. All parts and percentages are by weight unless otherwise stated.

*Example 1.—Preparation of 3,9-bis(p-hydroxyphenyl) spirobi(meta-dioxan)*

A 5 liter, three-neck, round-bottom flask equipped with a mechanical agitator, condenser, Dean-Stark moisture spirobi(meta-dioxan) as the bisphenol reactant. In this manner the corresponding dichloroformate is obtained.

*Example 11.—Polymerization of the dichloroformate of 3,9-bis(p-hydroxyphenyl)spirobi(meta-dioxan)*

A solution of 4.58 g. (0.01 mole) of the dichloroformate of 3,9-bis(p-hydroxyphenyl)spirobi(meta dioxan) in 50 ml. of methylene chloride is added to a solution of 1.0 g. of sodium hydroxide in 50 ml. of water, 3 drops of triethylamine and 0.014 g. of phenol contained in a 3-neck Morton flask, equipped with a mechanical stirrer, reflux condenser and thermometer. The reaction mixture is stirred for ten minutes. The organic layer is then washed with three 200 ml. portions of water by stirring in the Morton flask for 10 minutes. The organic layer is washed with successive portions of water until a pH of about 6 is attained. The organic layer is then slowly poured into a Waring Blendor containing 250 ml. of isopropanol. The polycarbonate of 3,9-bis(p-hydroxyphenyl)spirobi(meta-dioxan) is then precipitated and its structure may be represented as shown below:

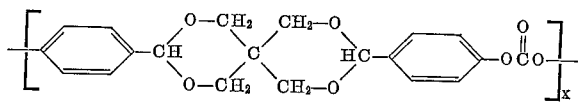

wherein x is an integer having a value sufficiently high to afford a normally solid polymer.

*Example 12.—Polymerization of the dichloroformate of 3,9-bis(p-2-chlorohydroxyphenyl)spirobi(meta-dioxan)*

The procedure described in Example 11 is followed with 5.27 g. (0.1 mole) of the dichloroformate of 3,9-bis(p-2-chlorohydroxyphenyl)spirobi(meta-dioxan) substituted for the dichloroformate of 3,9-bis(p-hydroxyphenyl)spirobi(meta-dioxan) and affords the corresponding polycarbonate.

*Example 13.—Preparation of the dichloroformate of 3,9-bis(p-2-methylhydroxyphenyl)spirobi(meta-dioxan)*

The procedure described in Example 11 is followed with 4.8 g. (0.61 mole) of the dichloroformate of 3,9-bis(p-2-methylhydroxyphenyl)spirobi(meta dioxan) and affords the corresponding polycarbonate.

The polycarbonates of this invention can be used for the fabrication of electrical switch components and connectors, instrument cases, lenses, water pump impellers and the like. Extruded film of these polycarbonates can be employed for capacitors and packaging.

*Example 14.—Polyurethane of 3,9-bis(p-hydroxyphenyl)spirobi(meta-dioxan)*

A solution of 0.86 g. (0.01 mole) of piperazine, 1.0 g. (0.025 mole) of sodium hydroxide, 0.01 g. of phenol and 0.1 ml. of triethylamine in 50 ml. of water is charged to the reaction vessel described in Example 5. A solution of 4,57 g. (0.01 mole) of the dichloroformate of 3,9-bis(p-hydroxyphenyl)spirobi(meta-dioxan) in 50 ml. of methylene chloride is added with stirring. After 5 minutes of stirring the aqueous layer is decanted. The organic layer is washed with water and then poured into a Waring Blendor containing 300 ml. of isopropanol to precipitate the polyurethane of 3,9-bis(p-hydroxyphenyl)spirobi(meta-dioxan).

The structure of this polyurethane may be represented as shown below:

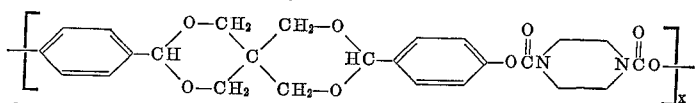

wherein x is an integer having values sufficiently high to afford a normally solid polymer.

The polyurethanes of this invention can be used to provide tough, abrasion resistant finishes on floors, wire, leather and rubber goods and the like.

*Example 15.—Polyurethane of 3,9-bis(p-2-methyldroxyphenyl)spirobi(meta-dioxan)*

The procedure and apparatus of Example 14 are used with 5.74 g. (0.01 mole) of 3,9-bis(p-2-methylhydroxyphenyl)spirobi(meta-dioxan). The polyurethane of 3,9-bis(p - 2 - methylhydroxyphenyl)spirobi(meta-idoxan) which forms is similar in physical properties to that derived from 3,9-bis(p-hydroxyphenyl)spirobi(meta-dioxan).

Although the invention has been described in its preferred forms, it is understood that the present disclosure has been made only by way of example, and that numerous changes in the details may be resorted to without departing from the spirit and the scope of the invention.

What is claimed is:

1. The bisphenol of spirobi(meta-dioxan) having the formula

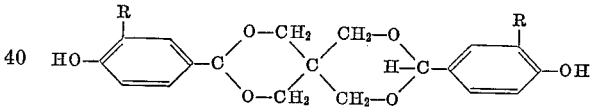

wherein R is a substituent selected from the group consisting of hydrogen, chlorine and methyl.

2. The bisphenol claimed in claim 1 wherein R is chlorine.

3. The bisphenol claimed in claim 1 wherein R is methyl.

4. Crystalline 3,9-bis(p-hydroxyphenyl)spirobi(meta-dioxan) having a melting range of about 249° to 257° C.

References Cited

UNITED STATES PATENTS 2,975,156   3/1961   Fekete _____ 260—340.7
3,246,011   4/1966   Muller et al. _____ 260—340.7

FOREIGN PATENTS 886,410   8/1961   Great Britain.

ALEX MAZEL, *Primary Examiner.*

J. TURNIPSEED, *Assistant Examiner.*